3,175,914
METHOD OF TREATING POTATO SOLIDS
Frederick H. Vahlsing, Jr., New York, N.Y., assignor to Vahlsing, Inc., a corporation of Delaware
No Drawing. Filed Jan. 9, 1963, Ser. No. 250,235
12 Claims. (Cl. 99—100)

This invention relates generally to a method of treating potato solids so as to develop uniform color and palatableness upon cooking the same and, more particularly, to the improvement of color and physical characteristics of frozen French fried potatoes.

The two most serious problems encountered in the commercial manufacture of frozen French fried potatoes are non-uniform color formation and poor textural qualities affecting the palatableness of the product. Ideally, French fried potatoes should be golden brown in color for maximum consumer attractiveness. Also, the finished fried product should have a crisp but not hard outer crust surrounding a mealy, white interior having the consistency of a baked potato.

These ideal characteristics in frozen French fried potatoes are difficult to obtain on a commercial scale for several reasons. First of all, environmental factors such as the source of the potatoes, their maturity when harvested, the conditions under which they have been stored, and the like all give rise to large variations in the composition of the raw potato which in turn make it difficult to achieve uniformity in the final product.

Color formation in the finished fried potato is now known to be caused basically by the interaction of reducing sugars and amino acids, with ascorbic acid, proteins and other materials also playing a minor role in the color forming process. The environmental factors mentioned above definitely cause changes in the quantity of the color forming bodies contained in the raw potato. For example, storage at low temperatures causes an increase in the reducing sugar content of the potato with a corresponding decrease in the starch content. On the other hand, at high storage temperatures the process is reversed, with increase in the starch content and decrease in the reducing sugar content. These variations are difficult to adjust for in a commercial process and make the problem of non-uniform color formation a serious one in the industry.

As for palatableness of the product, it is a fact that frozen French fried potatoes manufactured by conventional processes are often excessively oily and limp with concave sagging surfaces and collapsed interiors, when finished fried. These textural deficiencies definitely make the product less acceptable and detract from its palatableness.

There have been proposed several methods in the prior art to overcome these problems. One of the most widely known of these is the step of dipping the cut potatoes in an aqueous solution of absorbable reducing sugars prior to frying in order to level out the variations in reducing sugar content of the raw potatoes. The idea here is that if a uniform sugar content can be established in the raw potato, then the color developed from frying should also be uniform. However, this and other proposed suggestions have neither fulfilled initial expectations nor been widely accepted in the industry as a satisfactory solution to the problems.

I have now discovered a simple process for the treatment of potato solids which for the first time permits production of potato products on a commercial scale, and more particularly frozen French fried potatoes, which are remarkably uniform in both superior color and excellent textural qualities of palatableness. My invention is based on the surprising and unexpected discovery that if at least a surface layer of the potato solids is washed free of substantial amounts of sugars, and then wetted at controlled temperatures with an aqueous suspension of gelatinized starch then upon frying a uniform and pleasing golden-brown color is achieved on the surface of the potato solids as well as a crisp but not hard crust surrounding a mealy, white interior having the desirable consistency of a baked potato. Such results are completely contrary to the teachings of the prior art which has heretofore stressed the importance of the presence of sugars for good color and texture. In my process, the natural sugar content of the potato solids is substantially removed, at least in a surface layer, and after the surface layer is wetted with aqueous gelatinized starch, a superior, uniform golden-brown color is developed as the potato solids are fried. Furthermore, if the potato solids are subsequently frozen and then fried, broiled or oven heated for serving, the same pleasing golden-brown color is reconstituted as well as the excellent textural qualities previously mentioned. Finally, and perhaps most importantly, these results are completely reproducible in commercial operations, so that my process represents a significant advance in the potato industry.

In accordance with the present invention the cut potatoes are cooked in water to gelatinize the starch to the point where the starch granules are at least swollen and more or less solubilized and then the cooked potato pieces are washed with water to remove sugar from at least the surface layer thereof. Washing with water to remove sugar may be carried out while the potato pieces are being gelatinized but in the preferred process the removal of sugar from the surface layer is carried out after the cooking step.

The potato pieces are cooked by immersion in water at a sufficiently high temperature and for a sufficient period of time to cause gelatinization of the potato starch. The gelatinization temperature of potato starch is given as approximately 150° to 160° F. In the present commercial process water temperatures of from about 135° F. to 212° F. and immersion times of about 15 seconds to about 10 minutes are used in cooking the potato pieces.

The immersion time will vary inversely with the water temperature so that increase in temperature will require a shorter immersion time. It will be understood that the maximum time of immersion is not actually critical, and longer periods of immersion than the specific figure given may also be employed.

I prefer to control the gelatinization of the potato solids so that only a surface layer becomes gelatinized. By maintaining the interior of the potato solids in substantially raw or uncooked state, I have found that soluble components from the raw interior can not as readily migrate to the gelatinized surface layer. Thus, when the surface layer is subsequently washed to remove soluble sugars, control and time of washing is greatly facilitated. At the same time, it is certainly not essential to confine gelatinization of the potato solids only to a surface layer. As a matter of fact, the entire cross section of the potato solid can be permitted to gelatinize and the benefits of my process will still be realized though to a somewhat lesser extent.

Removal of sugar may be carried out during the cooking step by periodically replacing the water in the immersion tank or by providing a controlled rate of flow of water through the tank so as to avoid a build up in concentration of soluble components which would prevent the soluble sugars in the surface layer from passing into the wash water. This is not the preferred procedure however because of the heat lost by discarding the hot wash water.

Accordingly, the preferred manner in which the extraction of the gelatinized surface layer is carried out in my process is to remove the potato solids from the immersion tank immediately after gelatinization of the surface layer, and then wash the surface layer with copious quantities of fresh water and simultaneously arrest the gelatinization process. This is done by using wash water at a temperature below the gelatinization temperature of the potato solids and, in fact, the temperature of the wash water may be reduced by one hundred degrees or more whereby the potato solids will be subjected to a sudden thermal shock which will immediately arrest gelatinization and prevent its reoccurrence during the extraction step.

Generally speaking, the gelatinized surface layer of the potato solids can be washed substantially free of water soluble sugars by washing them in water at a temperature from about 32° F. to about 150° F. for from about 15 seconds to about 15 minutes. This can be done by passing the potato pieces through an immersion tank containing water which is periodically changed to avoid a build up in concentration of soluble components to a point where the soluble potato sugars are prevented from passing into the wash water. Preferably fresh water is flowed continuously through the immersion tank at a substantial rate of flow in order to achieve the maximum extraction effect. The maximum 15 minute period of washing is not critical but merely a practical limit for ordinary commercial operations. Longer periods of washing may therefore be employed. However, in order to remove substantial quantities of sugar to achieve the benefits of the invention, washing for at least 15 seconds is critical and essential.

As mentioned previously, the sugar content of the raw potatoes will vary according to environmental factors and additional variations will occur during processing of the potatoes. The minimum contact time of 15 seconds for washing removes a substantial quantity of sugars under any established washing conditions but, depending on the rate of flow of the wash water, the quantity of sugar that is actually extracted will vary. Control of the rate of flow of wash water is as a practical matter related to the color and crispiness that is desired in the final product and the rate of flow is readily adjusted in accordance with those characteristics which are desired in the finished product as determined by frying a sample of any given lot of potatoes.

Once the gelatinized surface layer on the potato solids has been extracted of substantial amount of soluble sugars, the surface layer is wetted with an aqueous suspension of gelatinized starch. As mentioned previously, this must be done at a controlled temperature and not substantially less than about 50° F. The starch saturates the surface layer at the controlled temperatures, and potato solids treated in this specific manner lead to superior fried products in uniformity of color and palatableness irrespective of the source of the potatoes that are so treated.

In wetting the extracted surface layer, the potato solids are immersed in a tank containing an aqueous suspension of gelatinized starch. Any type of starch may be employed but potato starch is preferred. In all cases the starch must be gelatinized, either in situ in the dip tank or in the form of pregelatinized starch. Suitable concentrations are from about 0.3% to about 10% starch by weight of the suspension. Again the maximum specified limit is not critical but merely practical, but the concentration of starch must be at least 0.3% in order to achieve the benefits of the present invention. The temperature of the starch suspension must not be substantially lower than about 50° F. and may be elevated up to about 212° F. The time of immersion may be anywhere from about 10 seconds to about 10 minutes. Again the maximum time of immersion is only a practical matter for commercial operations and longer wetting times may, if desired, be employed but it is important to hold the potato pieces in the starch suspension for at least 10 seconds. If the temperature of the starch suspension solution is elevated substantially, gelatinization of the starch in the interior of the potato solids may be recommenced during the wetting time. At the same time, however, the gelatinized starch added to the surface layer of the potato pieces is apparently fixed or in some way immobilized in the already gelatinized surface layer of the potato solids and this is essential in order to obtain the uniform color and palatableness that is possible with my process.

In wetting the potato solids with the starch suspension, I prefer that the suspension contain a small amount of sodium acid pyrophosphate, say from about 0.2% to about 3.0% by weight of the suspension. The phosphate material heightens the color development caused by the starch. But use of the phosphate material is certainly not essential in my process.

After the gelatinized surface layer of the potato solids has been wetted with the aqueous suspension of starch, the potato solids may be fried in conventional manner. The degree of frying carried out by the manufacturer is determined for the most part by the consumer for whom the product is intended. For restaurants and the institutional trade, the potato solids may be only par-fried and finish frying is left to the commercial establishment to carry out according to its requirements. On the other hand, for the home consumer, frying in the manufacturing plant may be carried out to a much greater degree since the average consumer will usually use an oven or broiler to heat and brown the potatoes before serving without additional frying. In either case, the superior color and palatableness of the product is reconstituted without any additional procedures or steps.

The frying is normally carried out at temperatures anywhere from about 325° F. to about 385° F. and, conventionally, hydrogenated vegetable oils such as hydrogenated cottonseed oil may be used as the frying medium. Frying time may be from 30 seconds to 4 minutes.

The important fact is that during frying, potato solids treated in accordance with my process develop a rich golden brown color which is substantially uniform throughout the pieces of the finished packaged product which is extremely pleasing in the sense of consumer attractiveness. Furthermore, the product develops a crisp but light outer crust which effectively prevents the excessive absorption of oil from the frying medium by the interior of the potato product. The interiors in potato solids treated in accordance with my process are pleasingly mealy, white and with a firm consistency which makes the product extremely palatable.

After frying, the product is quick frozen in conventional manner at temperatures below the freezing point of water, and preferably at −20° F.

As a specific example of my process, strips of potatoes having the shape necessary for frozen French fried potatoes were immersed in water at a temperature of 190° F. for approximately 3 minutes. This resulted in gelatinization of the surface layer of the potato solids. Thereafter, the potatoes were placed in a second tank and wash water at a temperature of 75° F. was continuously passed over the potatoes for approximately 2 minutes. Thereafter, the potatoes were immersed in an aqueous suspension containing 5% gelatinized corn starch and 0.5% sodium acid pyrophosphate at a temperature of about 140° F. and for approximately 2 minutes. The potatoes were then removed from the starch suspension solution, excess of which was shaken off them and then they were fried in hot hydrogenated cottonseed oil at a temperature of 360° F. for about 1½ minutes. The potatoes developed a rich golden color and were immediately frozen at −20° F.

When finished fried for serving, the potatoes developed a pleasing deep golden color with a light crisp crust surrounding a mealy, white interior with no noticeable absorption of fat therein.

It will be understood that conventional procedures such as the peeling and cutting of the potato into suitable shapes with automatic machinery and similar known techniques in the manufacture of other frozen French fry products may be employed. The potato solids may, of course, be cut into various shapes, smooth or crinkled as is known in the art.

It will be understood that it is intended to cover all changes and modifications of the preferred embodiments of the invention, herein chosen for the purpose of illustration which do not constitute departures from the spirit and scope of the invention.

I claim:

1. A method of treating potato solids, cut from whole potatoes, so as to develop uniform color and palatableness when frying the same which comprises the steps of removing water soluble sugars from at least a surface layer of the potato solids and then wetting said layer with an aqueous suspension of gelatinized starch at a temperature not substantially less than about 50° F., said suspension containing at least about 0.3% by weight of gelatinized starch.

2. A method of treating potato solids, cut from whole potatoes, so as to develop uniform color and palatableness when frying the same which comprises the steps of gelatinizing the starch inherently contained in at least a surface layer of the potato solids, removing water soluble sugars from said surface layer and wetting said surface layer with an aqueous suspension of gelatinized starch at a temperature not substantially less than about 50° F., said suspension containing at least about 0.3% by weight of gelatinized starch.

3. A method in accordance with claim 2 in which said steps of gelatinization in at least a surface layer of the potato solids and removal of water soluble sugars therefrom are carried out simultaneously.

4. A method in accordance with claim 2 in which said gelatinization in at least a surface layer of the potato solids is carried out prior to said step of removal of water soluble sugars therefrom.

5. A method in accordance with claim 2 in which said aqueous suspension of gelatinized starch also contains sodium acid pyrophosphate.

6. A method of treating potato solids, cut from whole potatoes, so as to develop uniform color and palatableness when frying the same which comprises the steps of contacting the potato solids with water at a temperature of at least 135° for at least about 15 seconds in order to gelatinize the starch inherently contained in at least a surface layer of said solids, washing said surface layer with water at a temperature of at least about 32° F. for at least about 15 seconds in order to remove water soluble sugars from said surface layer, and then wetting said surface layer with an aqueous suspension of gelatinized starch at a temperature of at least about 50° F. for at least about 10 seconds, said suspension containing at least about 0.3% by weight of gelatinized starch.

7. A method in accordance with claim 6 in which said aqueous suspension of gelatinized starch contains from about 0.2 to about 2.0% sodium acid pyrophosphate by weight of the suspension.

8. A method of treating potato solids cut from whole potatoes, so as to develop uniform color and palatableness when frying the same which comprises the steps of immersing said potato solids in water at a temperature of from about 135° to about 212° F. for about 15 seconds to about 10 minutes in order to gelatinize the starch inherently contained in at least a surface layer of said solids, washing said surface layer with water at a temperature of from about 32° to about 150° F. for from about 15 seconds to about 15 minutes to remove water soluble sugars from said surface layer and wetting said surface layer with an aqueous suspension containing from about 0.3% to about 10% by weight of gelatinized starch at a temperature of from about 50° F. to about 212° F. for from about 10 seconds to about 10 minutes.

9. A method in accordance with claim 8 in which said aqueous suspension of gelatinized starch contains from about 0.2 to about 3.0% sodium acid pyrophosphate by weight of the suspension.

10. A method in accordance with claim 8 which includes the additional step of frying said potato solids in a frying medium at a temperature of from about 325° to about 385° F. for from about 30 seconds to about 4 minutes.

11. A method in accordance with claim 10 in which said frying medium is hydrogenated cottonseed oil.

12. A method in accordance with claim 10 which includes the additional step of freezing said fried potato solids at a temperature below the freezing point of water.

References Cited by the Examiner

Talburt et al.: "Potato Processing," pp. 287–300, 1959, Avi Publishing Co., N.Y., SB211P8T3.

A. LOUIS MONACELL, *Primary Examiner.*